(12) United States Patent
Park et al.

(10) Patent No.: US 8,483,372 B2
(45) Date of Patent: Jul. 9, 2013

(54) APPARATUS AND METHOD FOR PROVIDING CLICK-TO-CALL SERVICE

(75) Inventors: Ho-Yeon Park, Seoul (KR); Je-Young Maeng, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/219,333

(22) Filed: Aug. 26, 2011

(65) Prior Publication Data

US 2012/0051531 A1 Mar. 1, 2012

(30) Foreign Application Priority Data

Aug. 27, 2010 (KR) .................. 10-2010-0083585
Jan. 17, 2011 (KR) .................. 10-2011-0004648

(51) Int. Cl.
*H04M 3/42* (2006.01)
*H04L 12/66* (2006.01)

(52) U.S. Cl.
USPC ............... 379/201.01; 370/352; 455/414.1

(58) Field of Classification Search
USPC ............ 370/352–356; 379/201.02, 216.01, 379/201.01; 455/414.1; 715/700; 725/37
See application file for complete search history.

(56) References Cited

U.S. PATENT DOCUMENTS

| | | | |
|---|---|---|---|
| 6,304,653 B1 * | 10/2001 | O'Neil et al. ............ | 379/265.09 |
| 6,614,899 B1 * | 9/2003 | Sollee et al. ............ | 379/218.01 |
| 6,980,641 B1 * | 12/2005 | Stanford et al. ............... | 379/354 |
| 2004/0001481 A1 * | 1/2004 | Kamenetsky et al. ........ | 370/353 |
| 2004/0122951 A1 * | 6/2004 | Beck et al. ..................... | 709/227 |
| 2004/0236441 A1 * | 11/2004 | Melideo .......................... | 700/83 |
| 2007/0203979 A1 | 8/2007 | Walker et al. | |
| 2008/0071745 A1 * | 3/2008 | Clarke .............................. | 707/3 |
| 2008/0198994 A1 * | 8/2008 | Yan .......................... | 379/216.01 |

FOREIGN PATENT DOCUMENTS

WO WO 2006/037166 4/2006

* cited by examiner

*Primary Examiner* — Harry Hong
(74) *Attorney, Agent, or Firm* — The Farrell Law Firm, P.C.

(57) ABSTRACT

A method for providing a click-to-call service includes receiving multimedia content, and acquiring a recipient's phone number from the multimedia content; generating a bridge call request message including the acquired recipient's phone number; and sending the bridge call request message to a telephony server device that forwards the bridge call request message to a bridge call provision device that provides a call connection so that the call connection is performed between a recipient's phone device corresponding to the recipient's phone number and a sender's phone device.

14 Claims, 18 Drawing Sheets

* 2.4.9 *A_ARG_TYPE_CallerID*

This state variable contains the unique identifier of a Caller. The format of this state variable is URI or *A_ARG_TYPE_TCPNone*. URI is used when a TCP creates a Call to a Remote Party in the WAN side. *A_ARG_TYPE_TCPNone* is used when a TCP creates a Call to a Remote Party in the same LAN side.

* 2.6.14 *BridgeCall()*

* 2.6.14.1 Arguments

* Table 2-38: Arguments for *BridgeCall()*

| Argument | Direction | relatedStateVariable |
|---|---|---|
| *CalledID* | *IN* | *A_ARG_TYPE_CallerID* |
| *CallerID* | *IN* | *A_ARG_TYPE_CallerID* |
| *CallID* | *OUT* | *A_ARG_TYPE_CallID* |

FIG.8

| UPnP | PHONE | AddressBook | Group | # | |
|---|---|---|---|---|---|
| Type | string | W | R | | 0 | - |
| | | | Values for this parameter are (the quotes must not be used when specifying the values for this parameter):<br>"Friends",<br>"Familiars",<br>"Parents",<br>"Children",<br>"Colleagues",<br>"Organizaion",<br>"Group",<br>"Sport",<br>"Hobby",<br>"NonUPnPPhone",<br>"Other",<br>The Type is not required to be unique among the Instances. For example, in case there are two different groups, both related to friends, it is possible to have two different Instances having "Friends" for Type value. | | |

FIG.12

APPARATUS AND METHOD FOR PROVIDING CLICK-TO-CALL SERVICE

PRIORITY

This application claims priority under 35 U.S.C. §119(a) to a Korean Patent Application filed in the Korean Intellectual Property Office on Aug. 27, 2010 and assigned Serial No. 10-2010-0083585, and a Korean Patent Application filed in the Korean Intellectual Property Office on Jan. 17, 2011 and assigned Ser. No. 10-2011-0004648, the entire content of each of which is incorporated herein by reference.

BACKGROUND OF THE INVENTION

1. Field of the Invention

The present invention relates generally to a click-to-call service, and more particularly, to an apparatus and method for providing a click-to-call service using Universal Plug and Play (UPnP) technology.

2. Description of the Related Art

The development of mobile networks and mobile terminal devices has contributed to the popularization of mobile phones, leading to the rapid growth of the mobile phone market. This popularization has led to the development of value-added services, such as video calls, in addition to traditional voice call services.

These mobile services have expanded their service coverage to home, contributing to the emergence of such technology as UPnP Telephony that allows users to enjoy the unique features of their mobile phones at home using Consumer Electronics (CE) devices such as Televisions (TVs).

UPnP Telephony enables interworking between CE devices and telephony devices. Using this technology, a user may make or receive calls through a TV at home in conjunction with a telephony device regardless of the types of the telephony devices that the user uses for the calls.

UPnP Telephony is highly likely to be adopted as the next standard of Digital Living Network Alliance (DLNA), because this technology may interwork not only with Mobile Telephony Service, but also with the existing telephony technologies such as Voice over Internet Protocol (VoIP) and Public Switched Telephone Network (PSTN). UPnP Telephony also has the same infrastructure (UPnP Device Architecture) as DLNA, which is the de facto standard for home media sharing.

Other technologies, which are similar in coverage to UPnP Telephony, may include Cordless Advanced Technology-internet and quality (CAT-iq) for home wireless phone connections and Session Initiation Protocol (SIP)-based Gm interfacestandardization of which is underway by Telecoms & Internet converged Services & Protocols for Advanced Networks (TISPAN).

Even though a user conventionally subscribes to paid services, on which advertisements are posted by advertisers or sponsors, the user may be required to pay call charges, if any, for contacting the advertisers. In this case, the user may feel that such charges somewhat unfair and should be paid by the advertisers.

In addition, a UPnP telephony server is embedded in the terminal on which the user desires to make calls, causing the hardware complexity. For example, if a phone with a UPnP telephony server is further away from the than another phone without a UPnP telephony server, the user must inconveniently walk to the phone with a UPnP telephony server in order to request and receive a click-to-call service.

SUMMARY OF THE INVENTION

An aspect of an embodiment of the present invention is to provide an apparatus and method for informing a user how to make free calls that are not provided by the conventional UPnP Telephony Click-to-Call service, when the user desires to make calls to advertisers.

Another aspect of an embodiment of the present invention is to provide an apparatus and method for allowing a user to easily make free calls on the third device with a home telephony feature regardless of the types of phone numbers provided by broadcast and other third party services.

In accordance with one aspect of the present invention, a method for providing a click-to-call service is provided. The method includes receiving multimedia content, and acquiring a recipient's phone number from the multimedia content; generating a bridge call request message including the acquired recipient's phone number; and sending the bridge call request message to a telephony server device that forwards the bridge call request message to a bridge call provision device that provides a call connection so that the call connection is performed between a recipient's phone device corresponding to the recipient's phone number and a sender's phone device.

In accordance with another aspect of the present invention, an apparatus for providing a click-to-call service is provided. The apparatus includes a service receiver module for receiving multimedia content; a phone number detection module for detecting a recipient's phone number from the multimedia content, and storing the detected recipient's phone number; and a telephony control point for generating a bridge call request message including the recipient's phone number, and sending the bridge call request message to a telephony server device that forwards the bridge call request message to a bridge call provision device that provides a call connection, such that the call connection is performed between a recipient's phone device corresponding to the recipient's phone number and a sender's phone device.

In accordance with further another aspect of the present invention, a method for providing a click-to-call service is provided, the method includes receiving multimedia content, and receiving a recipient's phone number from a telephony client device that has acquired the recipient's phone number from the multimedia content; receiving a sender's phone number from a telephony server device; generating a bridge call request message including the recipient's phone number and the sender's phone number; and sending the bridge call request message to a bridge call provision device that provides a call connection, such that the call connection is performed between a recipient's phone device corresponding to the recipient's phone number and a sender's phone device having the sender's phone number.

In accordance with yet another aspect of the present invention, an apparatus for providing a click-to-call service is provided. The apparatus includes a telephony control point for receiving multimedia content, receiving a recipient's phone number from a telephony client device that has acquired the recipient's phone number from the multimedia content, and receiving a sender's phone number from a telephony server device; and a bridge call request module for generating a bridge call request message including the recipient's phone number and the sender's phone number, and sending the bridge call request message to a bridge call provision device that provides a call connection, such that the call connection is provided between a recipient's phone device corresponding to the recipient's phone number and a sender's phone device.

BRIEF DESCRIPTION OF THE DRAWINGS

The above and other aspects, features and advantages of certain embodiments of the present invention will be more apparent from the following description taken in conjunction with the accompanying drawings, in which:

FIG. 8 is a diagram illustrating a bridge call request message defined in accordance with the UPnP telephony standard;

FIG. 12 is a diagram illustrating a Non UPnP Phone group defined as an additional element belonging to a group in the basic phone data model shown in FIG. 11;

Throughout the drawings, the same drawing reference numerals will be understood to refer to the same elements, features and structures.

DETAILED DESCRIPTION OF EMBODIMENTS OF THE PRESENT INVENTION

Figure 1:
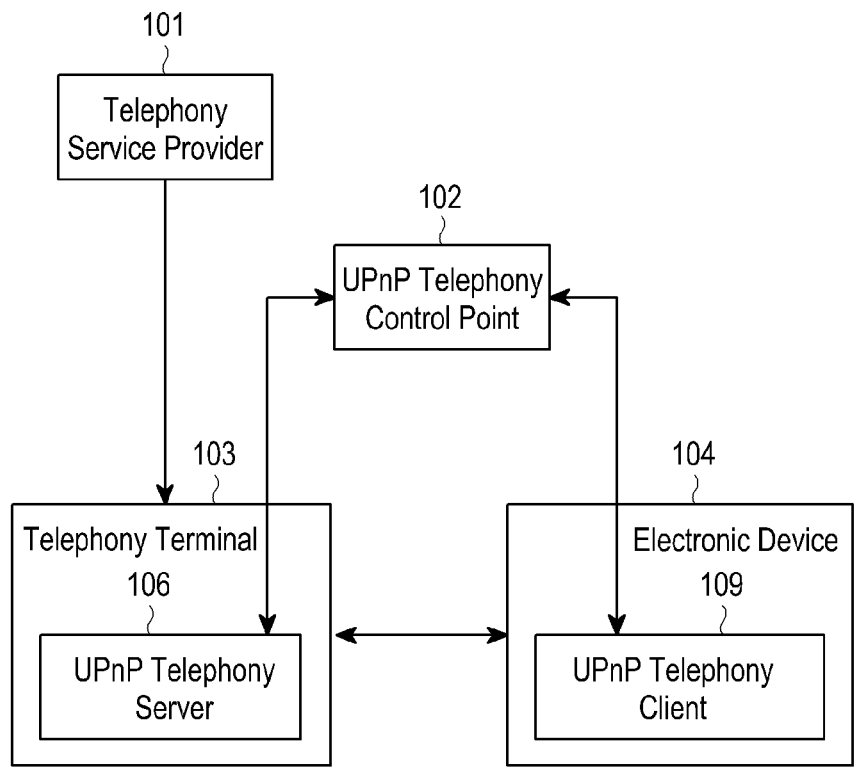
FIG. 1 is a diagram illustrating a basic configuration of a UPnP telephony system.

Embodiments of the present invention are described in detail herein below with reference to the accompanying drawings. In the following description, specific details such as detailed configuration and components are provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Home Network and UPnP

Generally, a home network, which includes Internet Protocol (IP)-based private networks, may connect and control a variety of heterogeneous devices used at home, such as Personal Computers (PCs), intelligent products, and wireless devices, in a single network, using a common virtual computing environment called a middleware.

The term "middleware" as used herein may refer to software for enabling inter-device communication by connecting various digital devices in a peer-to-peer manner, and may include Home Audio-Visual Interoperability (HAVI), Universal Plug and Play (UPnP), Java Intelligent Network Infrastructure (Jini), Home Wide Web (HWW), etc.

In a computing environment built through the use of UPnP middleware, for example, devices are allocated addresses from a server in accordance with a Dynamic Host Configuration Protocol (DHCP), or allocated addresses which are selected by an automatic IP addressing function (Auto IP), and may perform communication between devices and perform a search and a query in the network using the allocated addresses.

A UPnP network, the most popular home network technology, may be defined by UPnP devices, UPnP services, and a protocol between these services and devices. The UPnP network may include Controlled Devices (CDs), which are home network devices connected to and controlled by an IP-based home network, and a Control Point (CP), which is a device for controlling these CDs. The CP, which is a device for controlling the CDs, is a network element for requesting and receiving events. The CDs, which are devices for performing predetermined functions at the request of the CP, are network elements for sending events to the CP having requested the events, if there is a change in the state of the CDs.

Operation between UPnP network devices may include an advertisement process, a discovery process, a description process, a control process, and an eventing process.

In the advertisement process, a new CD informs other CDs in the home network of its presence after being connected to the home network. In the discovery process, a new CP searches for CDs connected to the home network and operating in the home network. In the description process, in order to control CDs, a CP identifies the features of a newly added CD(s) in more detail by parsing a service description eXtensible Markup Language (XML) file or a device description XML file using the IP addresses of the CDs searched in the discovery process. In the control process, in order for a CP to provide a specific service on a CD, the CP sends a control message (action request) for requesting a specific service to the CD in accordance with the UPnP Device Architecture using a Simple Object Access Protocol (SOAP), and receives a response message (result, and variable value) to the request. The eventing process is a process in which a CP checks a change in the state information of a CD(s) that has provided a specific service in reply to a control command transmitted from the CP.

FIG. 1 illustrates a basic configuration of a UPnP telephony system.

Referring to FIG. 1, the UPnP telephony system includes a telephony service provider 101, a UPnP telephony Control Point (CP) 102, a telephony terminal 103, and an electronic device 104. The telephony terminal 103 and the electronic device 104 are located within a space where they can communicate with the UPnP telephony control point 102 using a UPnP protocol.

The telephony service provider 101 provides a telephony service, and provides an interface for transmitting and receiving calls, to the telephony terminal 103.

The UPnP telephony control point 102 is a logical software module that controls a UPnP Telephony Server (TS) 106 and a UPnP Telephony Client (TC) 109, using a UPnP action. Although the UPnP telephony control point 102 may be configured in devices such as a Personal Computer (PC) and a Personal Digital Assistant (PDA), which are external to the telephony terminal 103 and the electronic device 104, the UPnP telephony control point 102 may be configured directly within the telephony terminal 103 and the electronic device 104. If the UPnP telephony control point 102 is included in a physical device such as the telephony terminal 103 or the electronic device 104, the UPnP telephony control point 102 may directly control the UPnP telephony server 106 or the UPnP telephony client 109 without using UPnP actions.

The UPnP telephony control point 102 receives, from the UPnP telephony server 106, capability information corresponding to a call data transmission agent included in the UPnP telephony server 106 or the UPnP telephony client 109, and based thereon, the UPnP telephony control point 102 determines media, a protocol, and a transmission format it will use for call transmission and reception. The UPnP telephony control point 102 generates a profile in which the determined media, protocol, and transmission format are defined, and transmits the generated profile to the UPnP telephony server 106 or the UPnP telephony client 109, thereby setting up an environment for the call data transmission agent included in the telephony terminal 103 or the electronic device 104.

The telephony terminal 103 is a CE device such as a telephone a physical device like a PC with Voice over IP (VoIP) configured in software, or a mobile communication terminal that interworks with a communication network. The telephony terminal 103 includes the UPnP telephony server 106 configured in software. The telephony terminal 103 controls call transmission and reception in association with the telephony service provider 101 providing the telephony service, using an interface provided by the telephony service provider 101.

The electronic device 104 is a CE device capable of inputting and outputting a user's audio and video, such as a mobile communication terminal or a video phone, or a physical device such as a PC or a TV, and includes the UPnP telephony client 109 configured in software. Using this home network system, users may conveniently transmit and receive calls at home.

Figure 2:
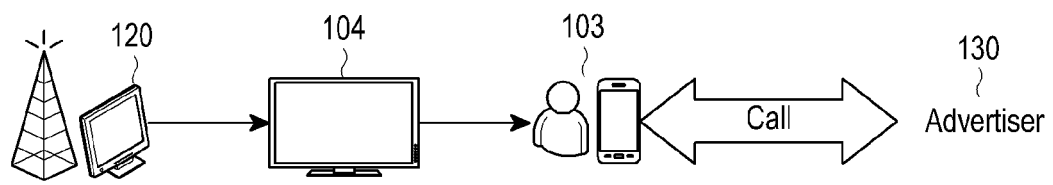
FIG. 2 is a diagram illustrating a scenario in which users are receiving a click-to-call service at home using UPnP telephony technology.

FIG. 2 illustrates a scenario in which users are receiving a click-to-call service at home using UPnP telephony technology.

Referring to FIG. 2, a user may receive a service from a content provider 120 using an electronic device 104 (e.g., a TV and a Set-Top Box (STB)). The service may include a broadcast service such as terrestrial and/or cable broadcasts, or a web-surfing service based on a web browser.

While using the service, the user may watch advertisements corresponding to various products and services. These advertisements generally include phone numbers at which the user may contact the advertisers (or sponsors) 130.

UPnP Telephony according to embodiments of the present invention provide a method for delivering the phone numbers of the advertisers 130 to a telephony terminal 103 with a built-in telephony server 106 to request the telephony terminal 103 to make calls. The user may contact the advertisers 130 simply by clicking the phone numbers on the advertisements and selecting a device on which he or she will make calls.

Embodiments of the present invention provides a method of informing a user how to make free calls to the advertisers, and a method for allowing the user to easily make free calls on a third device with a home telephony feature.

Figure 3:
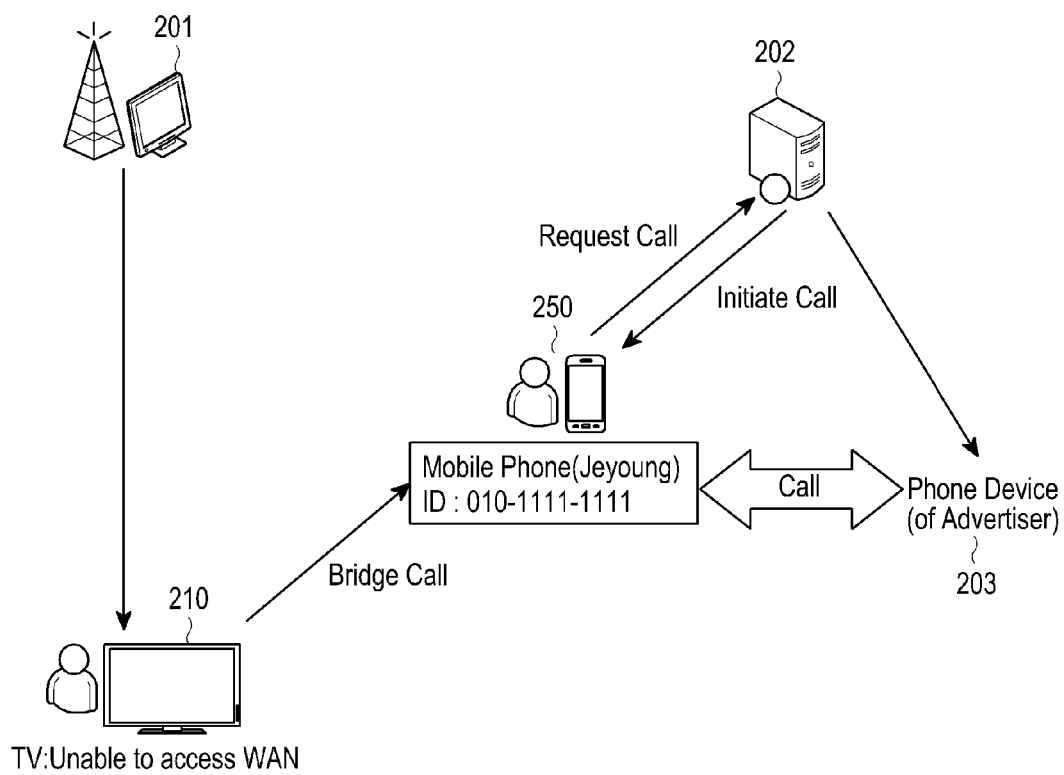
FIG. 3 is a diagram illustrating a device for providing an improved call bridge-based click-to-call service according to an embodiment of the present invention.

FIG. 3 illustrates a device for providing an improved call bridge-based click-to-call service according to an embodiment of the present invention.

A Telephony Control Point (TCP) device 210 receives, from a content provision device 201, digital multimedia content (e.g., broadcast content, video content, internet web content, etc.) including an advertisement(s), and a recipient's (or callee's) phone number of a phone device 203. The advertisement may be provided independently from the broadcast content. The recipient's phone number may be included in the advertisement or broadcast content, or may be provided separately in association with the advertisement. The content provision device 201 is a server device owned by a content provider (for example, a broadcast provider providing broadcast programs) and transmits content (or content data) wired or wirelessly. The phone device 203 corresponds to an advertiser's phone device or a recipient's phone device (e.g., a cell phone, a wire telephone, a VoIP terminal, etc.) owned by the advertiser.

A user connects with a TS device 250 with a built-in telephony server owned by the user, and delivers, to the TS device 250, a recipient's phone number corresponding to the phone device 203, on the TCP device 210 with a built-in UPnP TCP (e.g., an electronic device such as a TV). In this example, the TS device 250 corresponds to a user's phone device or a sender's phone device (e.g., a cell phone, a wire telephone, a VoIP terminal, etc.) owned by the user. The sender's phone device may include the TS device 250.

Upon receiving the recipient's phone number, the telephony server in the TS device 250 generates a message requesting a service from a bridge call provision device 202 based on the received recipient's phone number, and delivers the generated message to the bridge call provision device 202. The bridge call provision device 202 is owned by a bridge call provider (e.g., a common communication service provider) and provides call connections between multiple communication terminals. The bridge call provision device 202 may be a server device interworking with a communication service provision device providing a common phone service, or may include the communication service provision device.

The bridge call provision device 202 receives the sender's phone number corresponding to the user and the recipient's phone number corresponding to the advertiser from the TS device 250, makes calls to both sides, and connects the user and the advertiser so that the user and advertiser may talk to each other on the phone. In other words, a call connection is performed between the TS device 250 having the sender's phone number (or being allocated the sender's phone number) and the phone device 203 having the recipient's phone number. Specifically, the bridge call provision device 202 first sends a call to the TS device 250. If the TS device 250 receives the call, the bridge provision device 202 sends a call to the phone device 203. If the phone device 203 receives the call, the bridge provision device 202 makes a call connection between the TS device 250 and the phone device 203.

Figure 4:
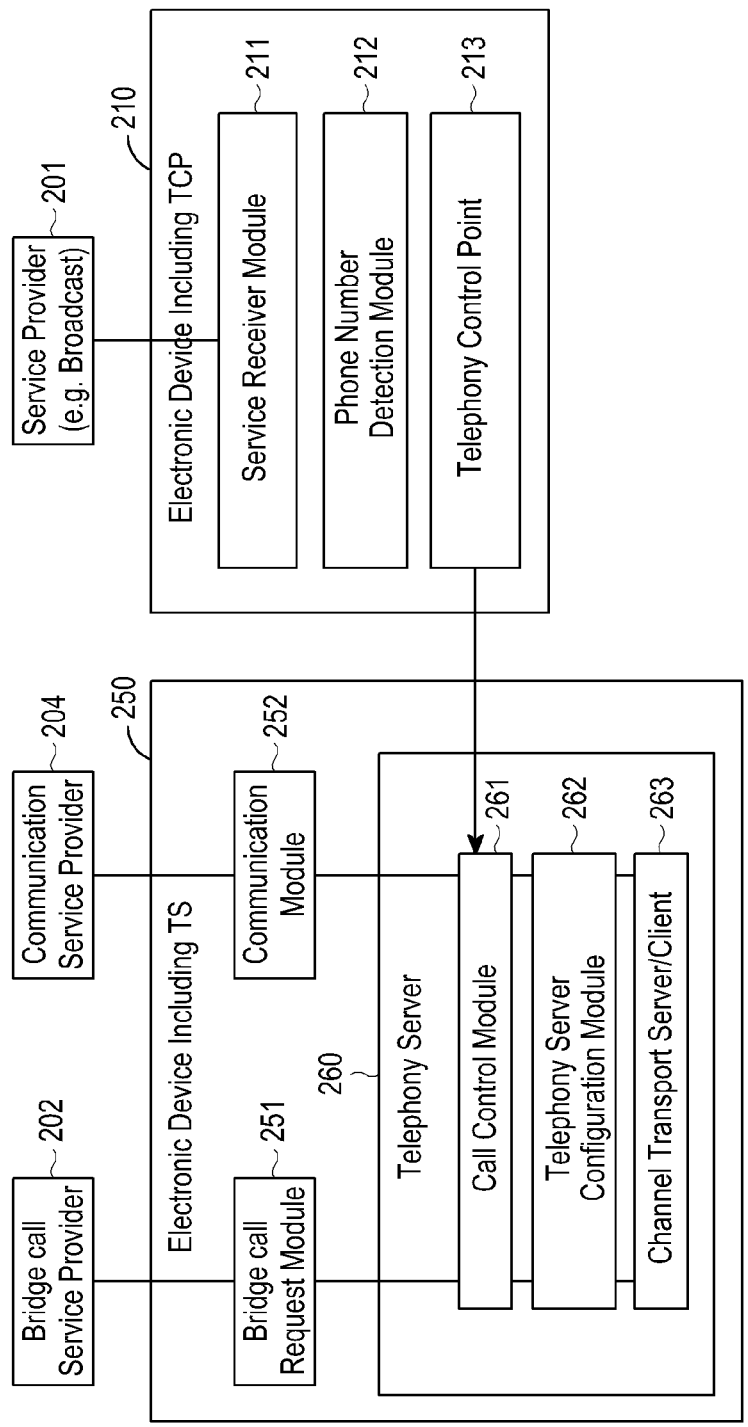
FIG. 4 is a diagram illustrating a device for providing an improved call bridge-based click-to-call service and internal structures of its major devices according to an embodiment of the present invention.

FIG. 4 illustrates a device for providing an improved call bridge-based click-to-call service and internal structures of its major devices according to an embodiment of the present invention.

Referring to FIG. 4, the TCP device 210 includes a service receiver module 211, a phone number detection module 212, and a Telephony Control Point (TCP) 213.

The service receiver module 211 receives the digital content including the advertisement by the advertiser and the recipient's phone number of the phone device 203. The received content is displayed on a user's display (not shown) mounted in the TCP device 210, while the recipient's phone number may or may not be displayed for the user.

The phone number detection module 212 detects and stores the recipient's phone number.

The telephony control point 213 sends a bridge call request message including the recipient's phone number to the TS device 250, if the user has selected the recipient's phone number or the advertisement associated with the recipient's phone number using input means like a remote controller.

The TS device 250 includes a telephony server 260 having a call control module 261, a bridge call request module 251, and a communication module 252. In addition to the call control module 261, the telephony server 260 may further include a telephony server configuration module 262 mounted in a common telephony server, and a channel transport server/client 263.

Upon receiving the bridge call request message including the recipient's phone number from the telephony control point 213, the call control module 261 controls the bridge call request module 251 to generate a bridge call request message including the sender's phone number and the recipient's phone number, and to send the bridge call request message to the bridge call provision device 202. The bridge call request message, which originates in a UPnP format, is converted into a HyperText Transfer Protocol (HTTP) format by the bridge call request module 251, and sent to the bridge call provision device 202 after the sender's phone number is added to the message.

The call control module 261 controls the communication module 252 to receive a call from a communication service provision device 204 in response to the bridge call request, and to connect a call to the phone device 203.

The user may control the TS device 250 equipped with the telephony server 260, using the telephony control point 213. Since the telephony control point 213 is a logical SoftWare (S/W) module, the telephony control point 213 may be embedded in any devices that the user uses to access a specific service. The phone number detection module 212 detects a phone number to be used for click-to-call in a content service used by the user and interworks with the telephony control point 213. For example, if a telephony control point is embedded in a TV used by the user, the phone number detection module 212 recognizes a phone number in the broadcast content or advertisement displayed on a TV screen and delivers the recognized phone number to the telephony control point. If the user is surfing the web on a PC, the phone number detection module 212 may detect and extract a phone number from a web page, and deliver the extracted phone number to the telephony control point.

The TS device 250, which is equipped with the telephony server 260, includes the bridge call request module 251 for receiving the recipient's phone number from the telephony control point 213 and delivering the recipient's phone number to the bridge call provision device 202 or the service provider's device providing the bridge call service. The bridge call request module 251 delivers the sender's phone number of the user who will make a call, and the recipient's phone number of the advertiser, to the bridge call provision device 202, using an interface provided by the bridge call provision device 202.

Figure 5:
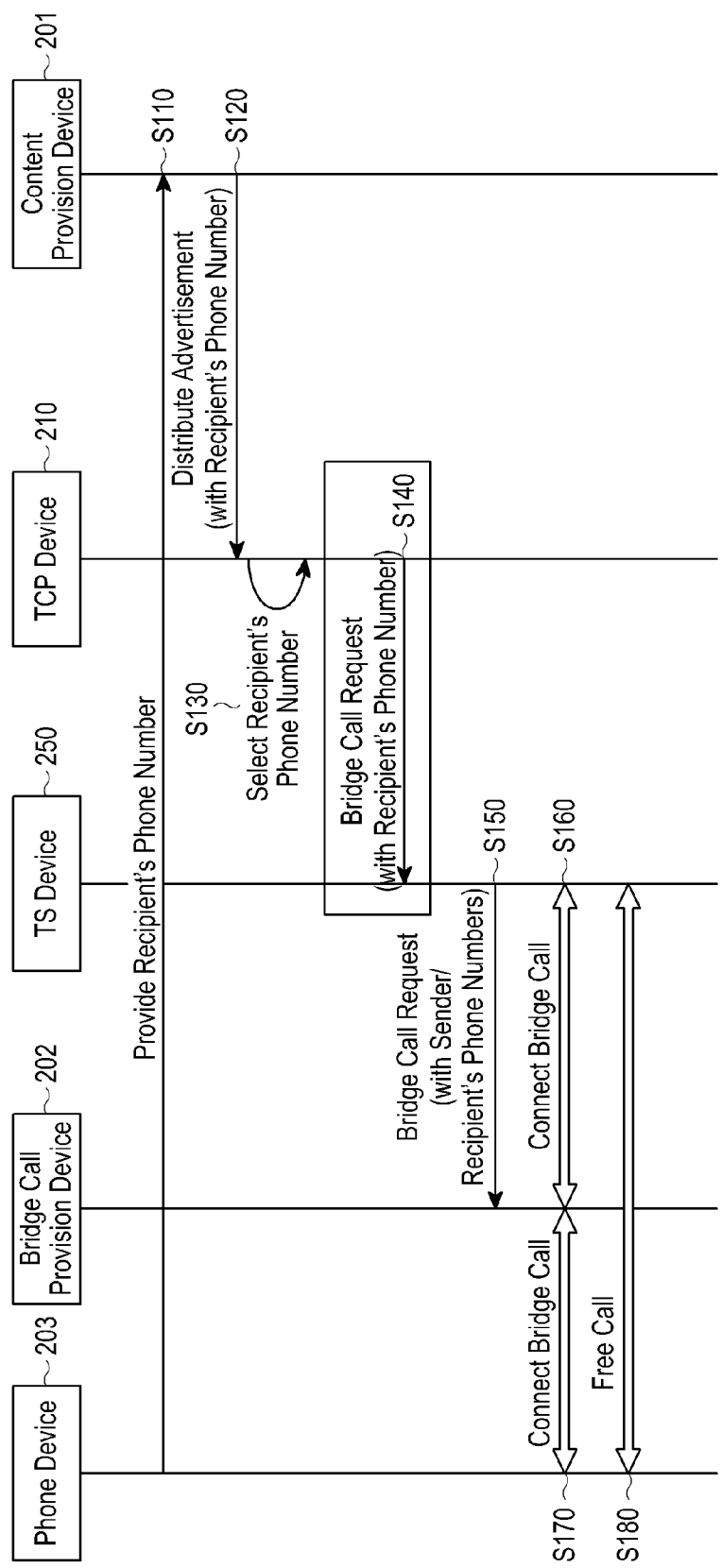
FIG. 5 is a flow diagram illustrating a method for providing an improved call bridge-based click-to-call service according to an embodiment of the present invention.

FIG. 5 illustrates a method for providing an improved call bridge-based click-to-call service according to an embodiment of the present invention, showing an operation of a device for providing the improved call bridge-based click-to-call service, and a process in which a user receives the improved call bridge-based click-to-call service using a phone number included in an advertisement by an advertiser.

The method described with reference to FIG. 5 assumes that a user is presently enjoying services such as broadcast and web, while carrying a cell phone supporting a UPnP telephony service.

Referring to FIG. 5, in step S110, a product and service provider (or advertiser), who wants to provide an advertisement to users, provides a recipient's phone number corresponding to a phone device 203 to a content provider in order to post the phone number on the broadcast or web. In this example, it will be assumed that the advertiser transmits a recipient's phone number to the content provision device 201 over the internet using his phone device 203.

In step S120, the content provision device 201 transmits digital content (e.g., broadcast or web content) including the advertisement by the advertiser, and the recipient's phone number of the phone device 203, to the TCP device 210. The recipient's phone number may be included in the advertisement or broadcast content, or may be separately provided in association with the advertisement. In this step, the content provider, such as a broadcast or web provider, may distribute the advertisement with the recipient's phone number along his content to the users receiving the content.

In step S130, the user selects the recipient's phone number displayed on the TCP device 210 or the advertisement associated with the recipient's phone number using input means such as a remote controller. After the user selects the recipient's phone number or the advertisement associated with the recipient's phone number, if multiple selectable phone devices are registered in the telephony control point 213 through the common advertisement process, discovery process, and description process, the telephony control point 213 may display a list of the multiple phone devices for the user so that the user may select any one of the multiple phone devices. In step S130, while receiving the content, the user may select a recipient's phone number and select a phone device equipped with a telephony server, on which the user may enjoy a bridge call-based click-to-call service.

In step S140, the phone number detection module 212 extracts and stores the user-selected recipient's phone number from the content received by the service receiver module 211. The extraction and storage of the recipient's phone number may be performed before the user's selection. The telephony control point 213 generates a bridge call request message including the recipient's phone number and sends the call request message to the TS device 250.

FIG. 8 illustrates a bridge call request message defined in accordance with the UPnP telephony standard.

A bridge call request message defined in accordance with the UPnP telephony standard may be represented as shown in FIG. 8. Referring to FIG. 8, CalleeID (or recipient ID) and CallerID (or sender ID) may be phone numbers or Uniform Resource Identifiers (URIs). CallID is a return value for BridgeCall( ).

The telephony control point 213 provides recipient's phone numbers as arguments of BridgeCall( ) without providing sender's phone numbers. In other words, arguments corresponding to the sender's phone numbers may be expressed as " ", NULL, etc. In this example, the sender automatically corresponds to the TS device 250 that receives the bridge call request message.

Referring back to FIG. 5, in step S150, the telephony server 260 mounted in the TS device 250 controls the bridge call request module 251 to send the bridge call request message including the recipient's phone number and the sender's phone number to the bridge call provision device 202. In step S150, the telephony server 260 may deliver the recipient's phone number CalleeID and the sender's phone number CallerID to the communication service provider providing the bridge call service.

In steps S160 and S170, the bridge call provision device 202 attempts to connect a bridge call to the TS device 250, in step S160, and attempts to connect a bridge call to the phone device 203, in step S170, if the TS device 250 receives the call.

In step S180, a call connection is performed between the TS device 250 and the phone device 203 if the phone device 203 receives the call. In step S180, the communication service provider establishes a call connection between the advertiser and the user based on the phone numbers, allowing the advertiser and the user to talk to each other on the phone.

Figure 6:
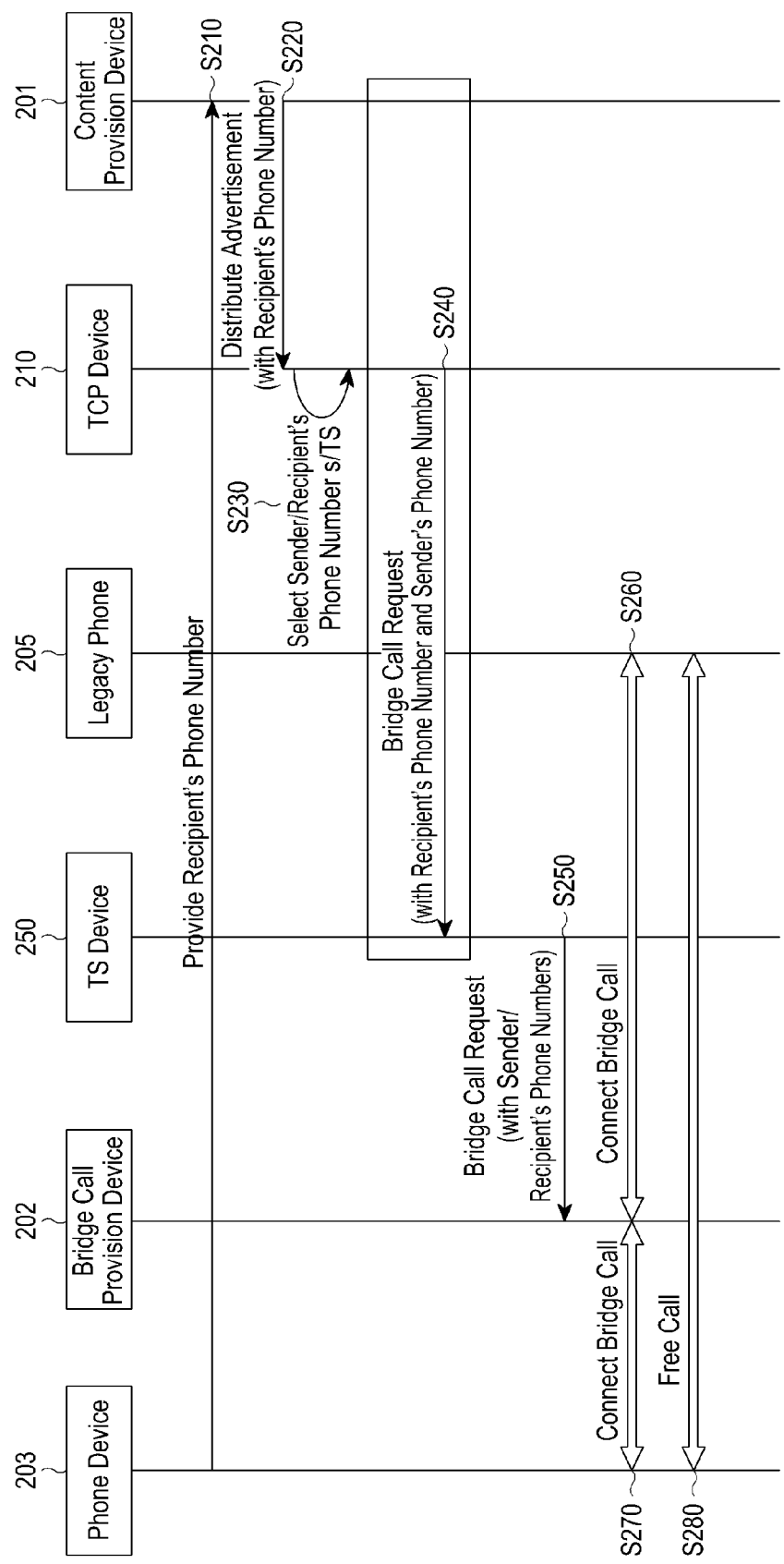
FIG. 6 is a flow diagram illustrating a method for providing an improved call bridge-based click-to-call service according to another embodiment of the present invention.

FIG. 6 illustrates a method for providing an improved call bridge-based click-to-call service according to another embodiment of the present invention, in which a user finally uses a separate phone device other than a phone device with a UPnP telephony server to make a call. In the method of FIG. 6, the phone device to be used for an actual call may not include a UPnP telephony server.

Referring to FIG. 6, in step S210, a product and service provider (or advertiser), who wants to provide an advertisement to users, provides a recipient's phone number of his phone device 203 to a content provider in order to post his phone number on the broadcast or web.

In step S220, the content provision device 201 transmits digital content (e.g., broadcast or web content) including the advertisement by the advertiser, and the recipient's phone number corresponding to the phone device 203, to the TCP device 210.

In step S230, the user selects the recipient's phone number displayed on the TCP device 210 or the advertisement associated with the recipient's phone number using input means such as a remote controller. The telephony control point 213 displays a list of phone devices (or a list of their associated phone numbers) for the user so that the user may select any one of the listed phone devices registered through the common advertisement process, discovery process, and description process. The list of phone numbers may be fetched from a UPnP telephony server with a Phone Data Model (PDM) at home using a UPnP mechanism, may be stored in the telephony control point 213 itself, or may be fetched from other devices in various different ways in accordance with embodiments of the present invention.

The telephony control point 213 displays a list of multiple TS devices for the user so that the user may select any one of the selectable TS devices. In step S230, while receiving the content, the user may select his interested recipient's phone number, select a sender's phone number of a phone device on which the user will actually make a phone call, and select a TS device equipped with a telephony server, on which the user may enjoy a click-to-call service.

In step S240, the phone number detection module 212 extracts and stores the selected recipient's phone number received by the service receiver module 211. The extraction and storage of the recipient's phone number may be performed before the user's selection. The telephony control point 213 generates a bridge call request message including the selected recipient's and sender's phone numbers, and sends the bridge call request message to the TS device 250 selected by the user. In the present example, the user selects a legacy phone 205 or a phone device without a telephony server, and the sender's phone number corresponds to a phone number of the legacy phone 205.

In step S250, the telephony server 260 mounted in the TS device 250 controls the bridge call request module 251 to send the bridge call request message including the recipient's phone number and the sender's phone number to the bridge call provision device 202.

In steps S260 and 270, the bridge call provision device 202 attempts to connect a bridge call to the legacy phone 205, in step S160, and, if the legacy phone 205 receives the call, attempts to connect a bridge call to the phone device 203 in step S170.

In step S280, a call connection is performed between the legacy phone 205 and the phone device 203 if the phone device 203 receives the call.

Figure 7:
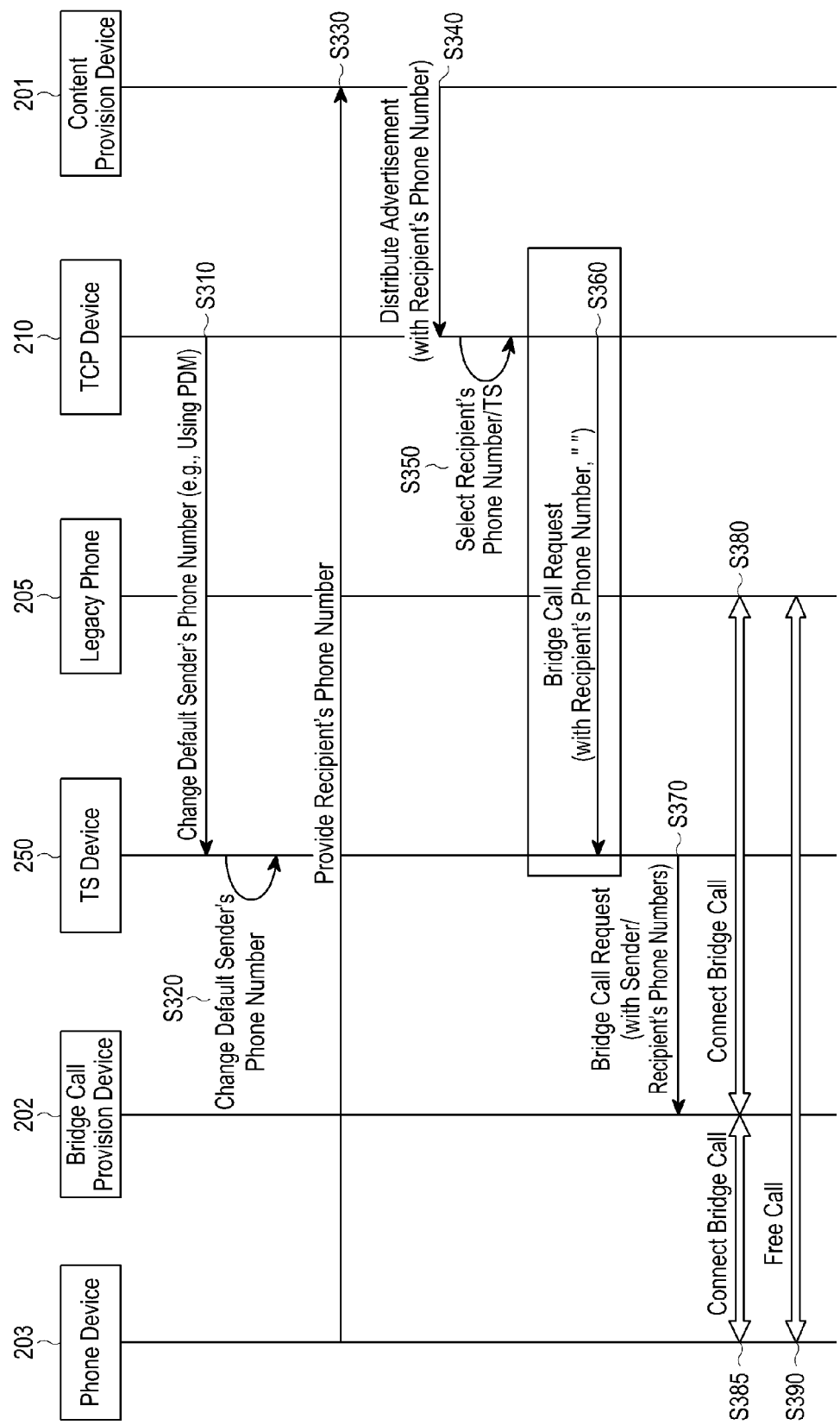
FIG. 7 is a flow diagram illustrating a method for providing an improved call bridge-based click-to-call service according to further another embodiment of the present invention.

FIG. 7 illustrates a method for providing an improved call bridge-based click-to-call service according to further another embodiment of the present invention, in which a call is connected using a preset sender's phone number even though a user does not designates a sender's phone number.

In step S310, the telephony control point 213 displays a list of selectable phone numbers for the user based on, for example, the home PDM, and the user may set or change a sender's phone number to be used by default when the user enjoys the bridge call-based click-to-call service. The telephony control point 213 sends a request message for setting or changing the sender's phone number, which includes the phone number itself, to the TS device 250. In step S320, upon receiving the request message, the telephony server 260 in the TS device 250 sets the received sender's phone number as a default sender's phone number of the TS device 250.

In step S330, a product and service provider (or advertiser), who wants to provide an advertisement to users, provides a recipient's phone number of his phone device 203 to a content provider in order to post the phone number on the broadcast or a web site.

In step S340, the content provision device 201 transmits digital content including the advertisement and the recipient's phone number, to the TCP device 210.

In step S350, the user selects the recipient's phone number displayed on the TCP device 210 or the advertisement associated with the recipient's phone number using input means such as a remote controller.

The telephony control point 213 may display a selectable list of TS devices for the user. In step S350, while receiving the content, the user may select a recipient's phone number and a TS device equipped with a telephony server, through which the user may receive the click-to-call service.

In step S360, the phone number detection module 212 extracts and stores the selected recipient's phone number received by the service receiver module 211. The extraction and storage of the recipient's phone number may be performed before the user's selection. The telephony control point 213 generates a bridge call request message including the recipient's phone number, and sends the bridge call request message to the TS device 250.

In step S370, the telephony server 260 in the TS device 250 controls the bridge call request module 251 to send a bridge call request message including the recipient's phone number and the sender's phone number to the bridge call provision device 202.

In step S380, the bridge call provision device 202 attempts to connect a bridge call to the legacy phone 205, in step S380. If the legacy phone 205 receives the call, in step S385, the bridge call provision device 202 attempts to connect a bridge call to the phone device 203.

In step S390, if the phone device 203 receives the call, a call connection is performed between the legacy phone 205 and the phone device 203.

Figure 9:
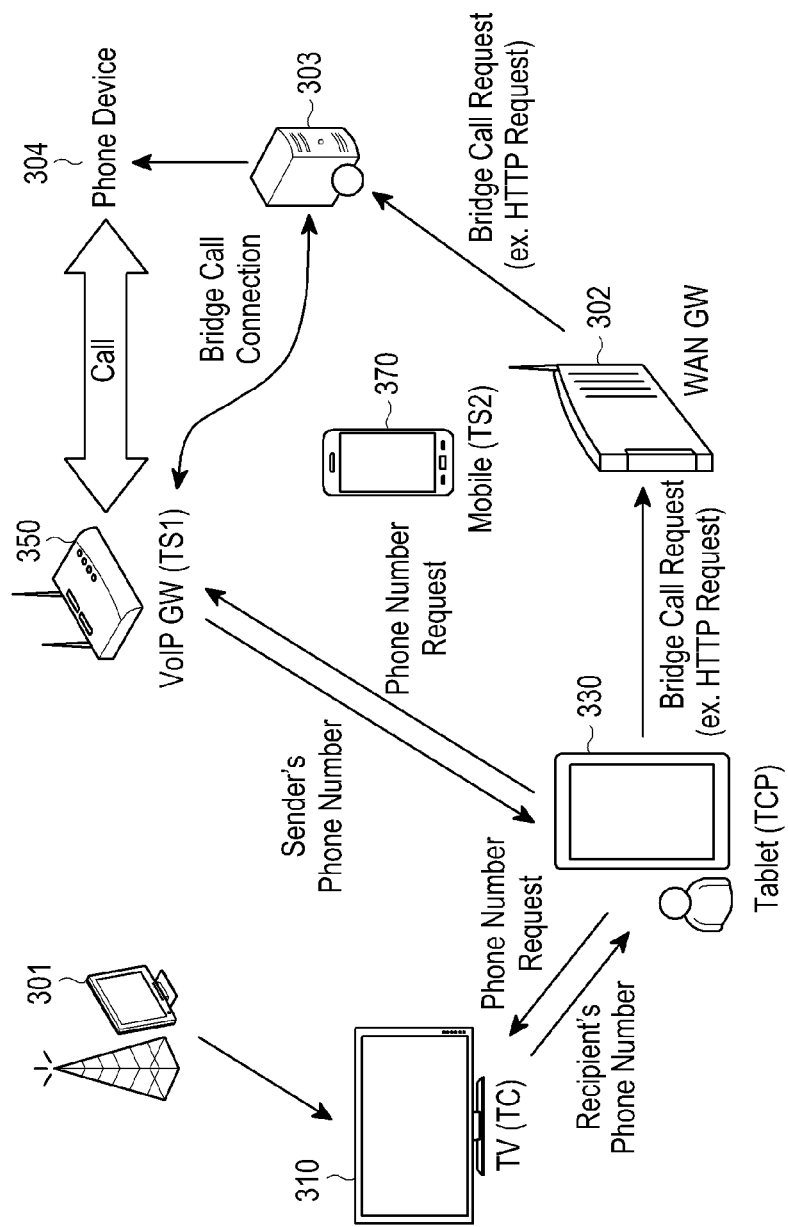
FIG. 9 is a diagram illustrating a device for providing an improved call bridge-based click-to-call service according to another embodiment of the present invention.

FIG. 9 illustrates a device for providing an improved call bridge-based click-to-call service according to another embodiment of the present invention.

Referring to FIG. 9, a Telephony Client (TC) device 310 receives digital content including an advertisement and a recipient's phone number corresponding to a phone device 304 from a content provision device 301. The phone device 304 corresponds to an advertiser's phone device or a recipient's phone device (e.g., a cell phone, a wire telephone, a VoIP terminal, etc.) owned by the advertiser. The TC device 310 transmits the received recipient's phone number selected or set by the user, to a TCP device 330.

The TCP device 330 (e.g., a tablet) equipped with a UPnP Telephony Control Point (TCP) receives sender's phone numbers from TS devices 350 and 370, and displays the received sender's phone numbers for the user. The UPnP TCP may display the recipient's phone number for the user. In an alternative example according to an embodiment of the present invention, the user may select any one of the TS devices 350 and 370, the TCP device 330 may request a phone number from the selected TS device 350, and the selected TS device 350 may transmit its own phone number and/or phone numbers of other phone devices, to the TCP device 330. In this example, the TS device 350 corresponds to a user's phone device or a sender's phone device (e.g., a cell phone, a wire telephone, a VoIP gateway (GW), etc.) owned by the user. The sender's phone device may include the TS device 350. The sender's phone device may be automatically selected if there is only one sender's phone device, or if the phone device meets a predetermined user condition.

The TCP device 330 generates a bridge call request message including the recipient's phone number and the sender's phone number, and sends the generated message to a bridge call provision device 303 via a Wide Area Network (WAN) Gateway (GW) 302. The bridge call provision device 303 is a communication device owned by the bridge call provider (e.g., a common communication service provider) and provides call connections between multiple communication terminals.

The bridge call provision device 303 receives the sender's phone number of the user and the recipient's phone number of the advertiser from the TCP device 330, makes calls to both sides, and connects the user and the advertiser in order for the user and advertiser to talk to each other on the phone. In other words, a call connection is performed between the TS device 350 or a legacy phone having the sender's phone number (or being allocated the sender's phone number) and the phone device 304 having the recipient's phone number. In this example, the bridge call provision device 303 first sends a call to the TS device 350, sends a call to the phone device 304 if the TS device 350 receives the call, and makes a call connection between the TS device 350 and the phone device 304 if the phone device 304 receives the call.

Figure 10:
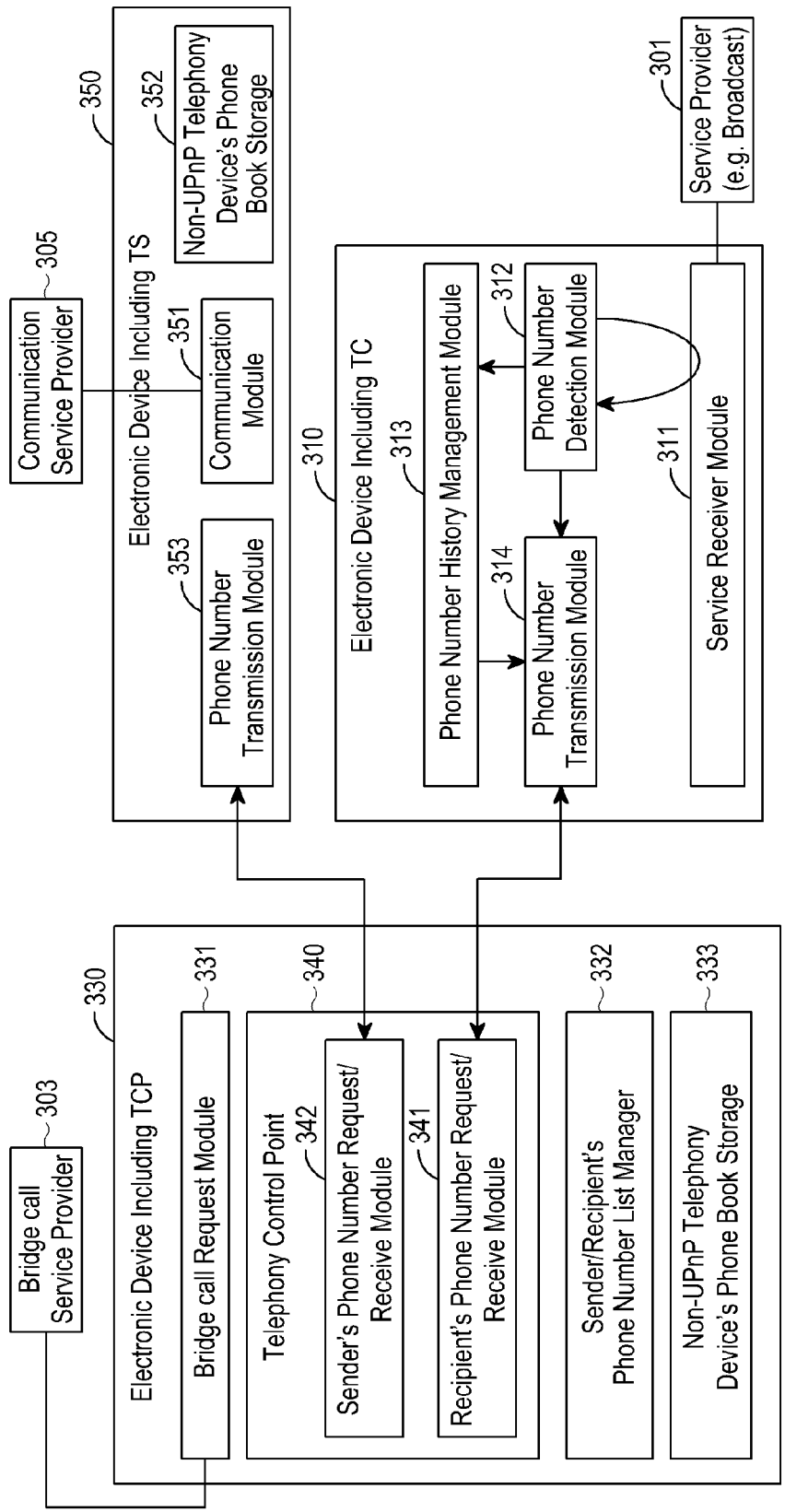
FIG. 10 is a diagram illustrating a device for providing an improved call bridge-based click-to-call service, and internal structures of its major devices according to another embodiment of the present invention.

FIG. 10 illustrates a device for providing an improved call bridge-based click-to-call service, and internal structures of its major devices according to another embodiment of the present invention.

Referring to FIG. 10, the TCP device 330 includes a sender/recipient's phone number list manager 332, a non-UPnP telephony device's phone book storage 333, a Telephony Control Point (TCP) 340, and a bridge call request module 331. The telephony control point 340 includes a recipient's phone number request/receive module 341, and a sender's phone number request/receive module 342. The TCP device 330 may display a sender's phone number list and a recipient's phone number list for the user so that the user may select a sender's phone number and a recipient's phone number.

The recipient's phone number request/receive module 341 sends a message for requesting a recipient's phone number selected by the user from the TC device 310, and the TC device 310 sends a response message including a recipient's phone number selected by the user to the recipient's phone number request/receive module 341 in response to request message. In an alternative example according to an embodiment of the present invention, the TC device 310 may transmit a recipient's phone number that is selected by the user without a request from the recipient's phone number request/receive module 341, or that satisfies a preset user condition. The TC device 310 may transmit a phone number history list or may transmit (i.e., update) only a changed list at regular intervals or when a new phone number is detected.

The sender's phone number request/receive module 342 sends a message for requesting a phone number from the TS device 350 selected by the user, and the TS device 350 sends a response message including its own phone number and/or phone numbers of other phone devices to the sender's phone number request/receive module 342 in response to the request message. In an alternative example according to an embodiment of the present invention, the TS device 350 may transmit its own phone number and/or phone numbers of other phone devices without a request from the recipient's phone number request/receive module 341.

The sender/recipient's phone number list manager 332 stores the received sender's phone numbers and recipient's phone numbers, and transmits the sender's phone number and recipient's phone number selected by the user to the bridge call request module 331.

The non-UPnP telephony device's phone book storage 333 stores and manages a list of phone numbers of the phone devices without a telephony server, and may receive the list from at least one of the TS devices 350 and 370.

The telephony control point 340 controls the bridge call request module 331 to generate a bridge call request message including the sender's phone number and the recipient's phone number, and to send the generated bridge call request message to the bridge call provision device 303. The bridge call request message may have an HTTP format.

The TC device 310 includes a service receiver module 311, a phone number detection module 312, a phone number history management module 313, and a phone number transmission module 314.

The service receiver module 311 receives digital content including an advertisement and the recipient's phone number of the phone device 304. The received content is displayed for the user on a display mounted in the TCP device 310, while the recipient's phone number may or may not be displayed.

The phone number detection module 312 detects (i.e., discovers) the recipient's phone number from the received content, and delivers the detected recipient's phone number to the phone number history management module 313. The detection of the recipient's phone number may be performed automatically or according to a user's selection.

The phone number history management module 313 stores and manages the detected phone number list, and if the user has selected a specific recipient's phone number, the phone number history management module 313 delivers the selected recipient's phone number to the phone number transmission module 314. The phone number history management module 313 may store the recipient's phone number and information about its associated advertiser together, and may display the recipient's phone number and the list of advertisers. The user may select the recipient's phone number from the displayed list. The TC device 310 may transmit the information about the advertiser to the TCP device 330 together with the recipient's phone number.

The phone number transmission module 314 sends a message including the selected recipient's phone number to the TCP device 330. The phone number transmission module 314 may transmit the recipient's phone number requested by the TCP device 330 to the TCP device 330.

The TS device 350 includes a communication module 351, a non-UPnP telephony device's phone book storage 352, and a phone number transmission module 353.

The TS device 350 controls the communication module 351 to receive a call corresponding to a bridge call request from a communication service provision device 305, and to connect a call to the phone device 304.

The phone number transmission module 353 sends a message including its phone number and/or the phone number list stored in the non-UPnP telephony device's phone book storage 352, to the TCP device 330 in response to a request from the TCP device 330.

Figure 11:
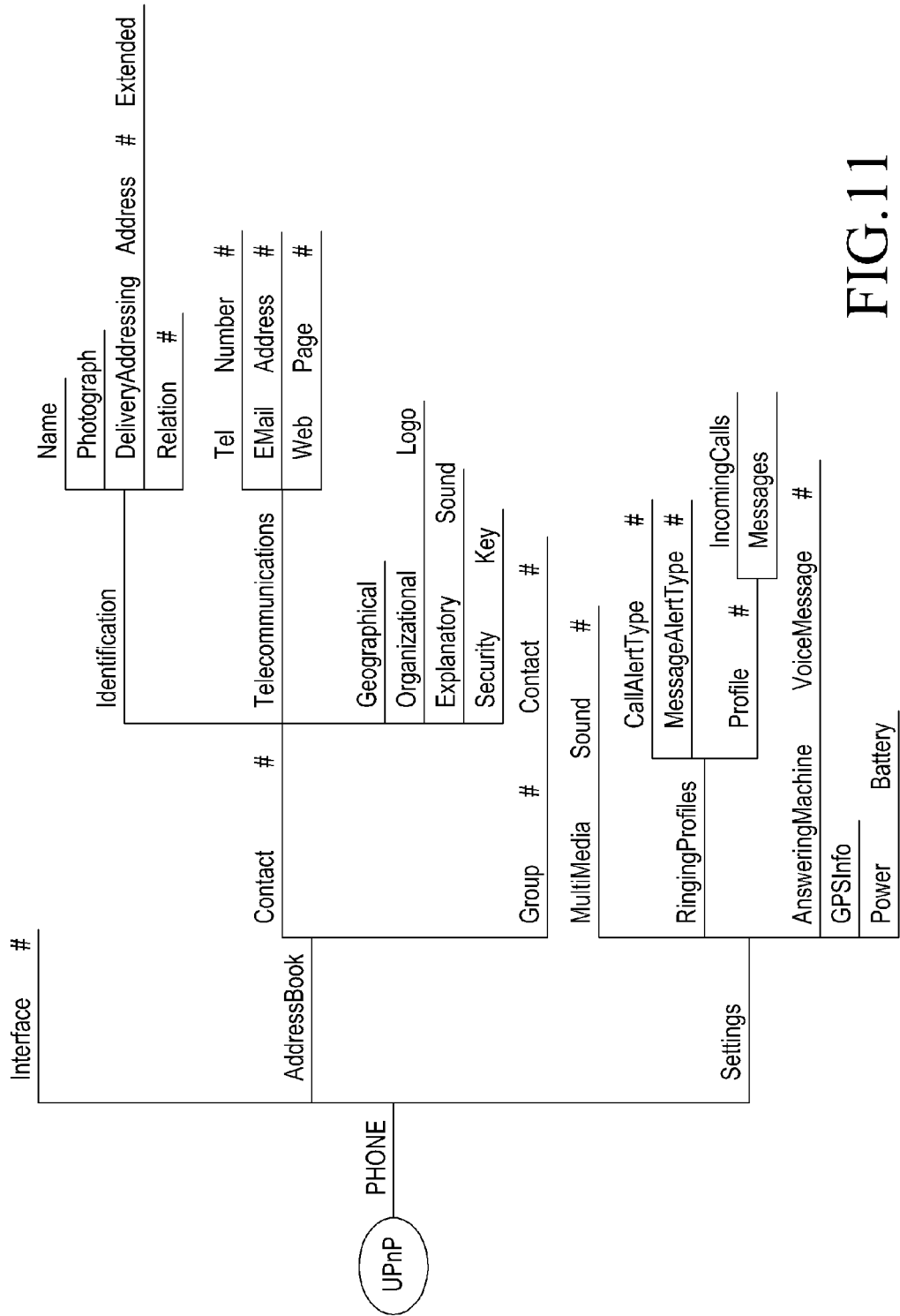
FIG. 11 is a diagram illustrating a phone data model basically provided in a TS device according to an embodiment of the present invention.

FIG. 11 illustrates a phone data model provided in a TS device, showing a phone data model based on a data model of UPnP Device Management (DM) according to an embodiment of the present invention. Using a modified structure of this basic phone data model, the present invention stores and manages a list of phone numbers of the phone devices without a telephony server.

FIG. 12 illustrates a Non-UPnP Phone group defined as an additional element belonging to a group in the basic phone data model shown in FIG. 11. Phone numbers of non-UPnP telephony devices are basically stored as one contact, and automatically stored in the Non-UPnP Phone group.

Figure 13:
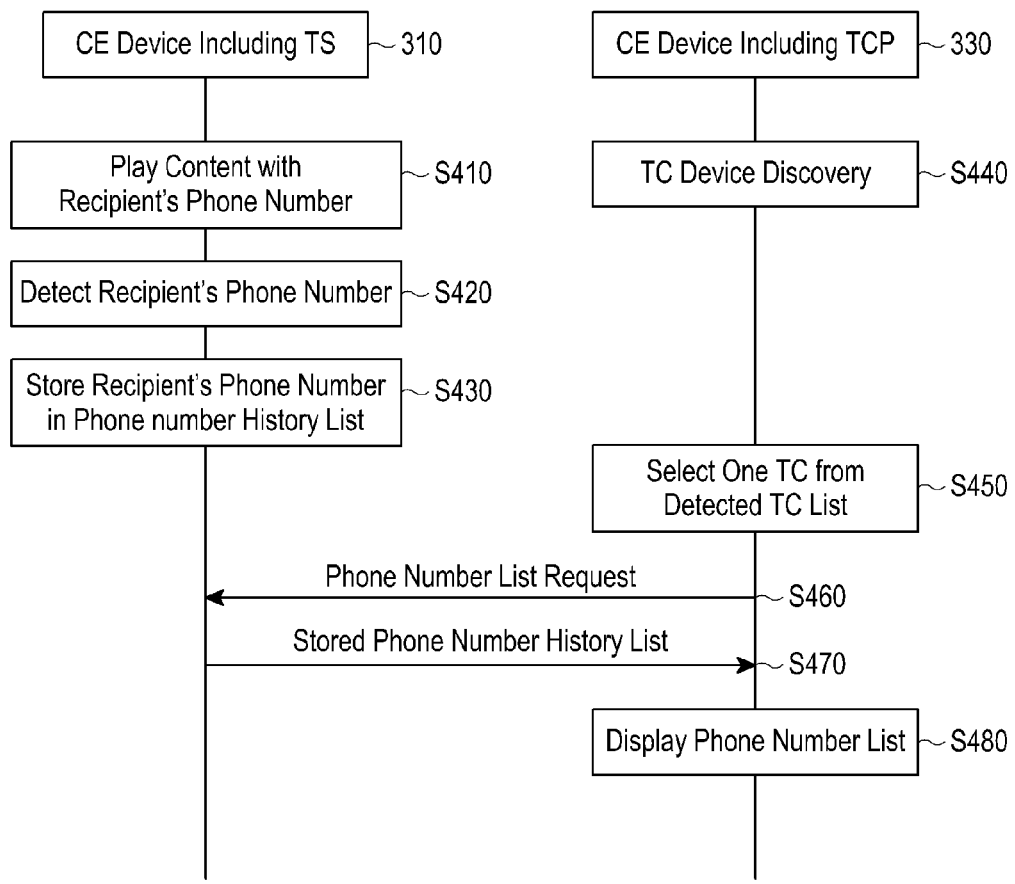
FIG. 13 is a diagram illustrating a mutual operation between the TC device and the TCP device shown in FIG. 10.

FIG. 13 illustrates a mutual operation between the TC device and the TCP device shown in FIG. 10 according to an embodiment of the present invention.

Referring to FIG. 13, in step S410, the TC device 310 receives content including a recipient's phone number from the content provision device 301, and plays the received content.

In step S420, the phone number detection module 312 in the TC device 310 detects the recipient's phone number from the content being played.

In step S430, the phone number history management module 313 in the TC 310 stores the recipient's phone number provided from the phone number detection module 312 in a phone number history list. The TC device 310 waits until a phone number list request is received from the TCP device 330. In an alternative example according to an embodiment of the present invention, the TC device 310 may transmit a phone number history list or may transmit (i.e., update) only a changed list, either at regular intervals or when a new phone number is detected.

In step S440, the TCP device 330 discovers its neighboring TC device 310 and other TC devices.

In step S450, the TCP device 330 displays a list of the TC devices, for the user. The user selects the TC device 310 from the list of TC devices.

In step S460, the recipient's phone number request/receive module 341 in the TCP device 330 requests a recipient's phone number or its list from the TC device 310.

In step S470, the phone number transmission module 314 in the TC device 310 transmits the recipient's phone number or its list requested by the TCP device 330. The TC device 310 may transmit only the recipient's phone number associated with the advertisement included in the content being played, or may transmit the previously detected phone number list together.

In step S480, the TCP device 330 displays the received recipient's phone number list, for the user.

Figure 14:
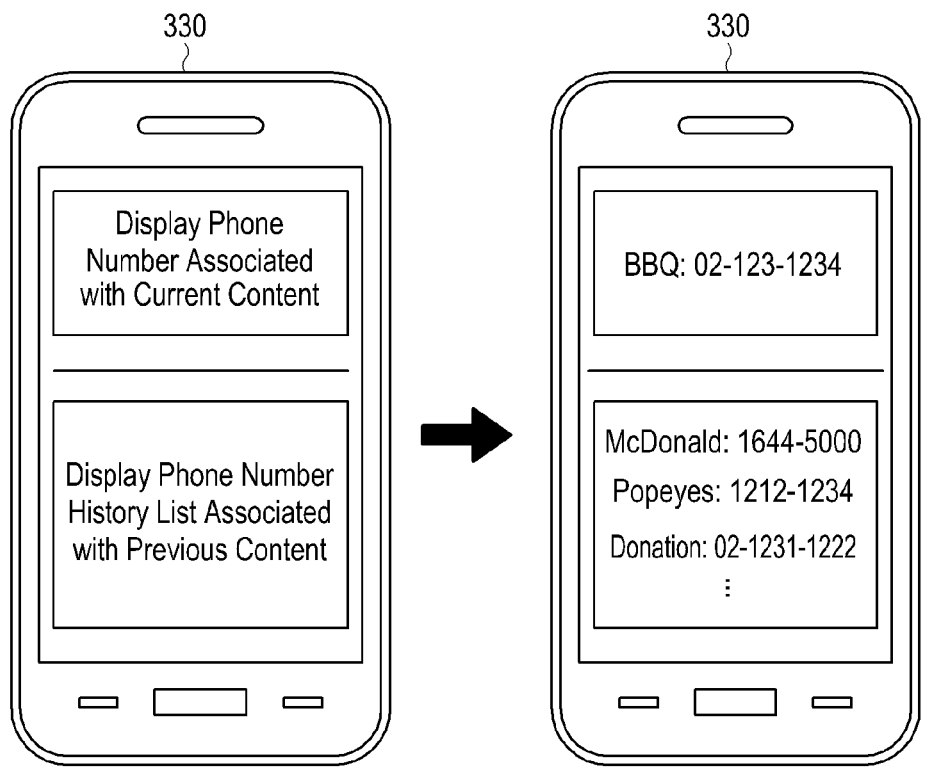
FIG. 14 is a diagram illustrating a recipient's phone number list displayed on a display of a TCP device according to an embodiment of the present invention.

FIG. 14 illustrates a recipient's phone number list displayed on a display of the TCP device 330 according to an embodiment of the present invention. For example, a recipient's phone number associated with an advertisement included in the content being played may be displayed on the top of the display, while the previously detected phone number list may be displayed on the bottom of the display.

Figure 15:
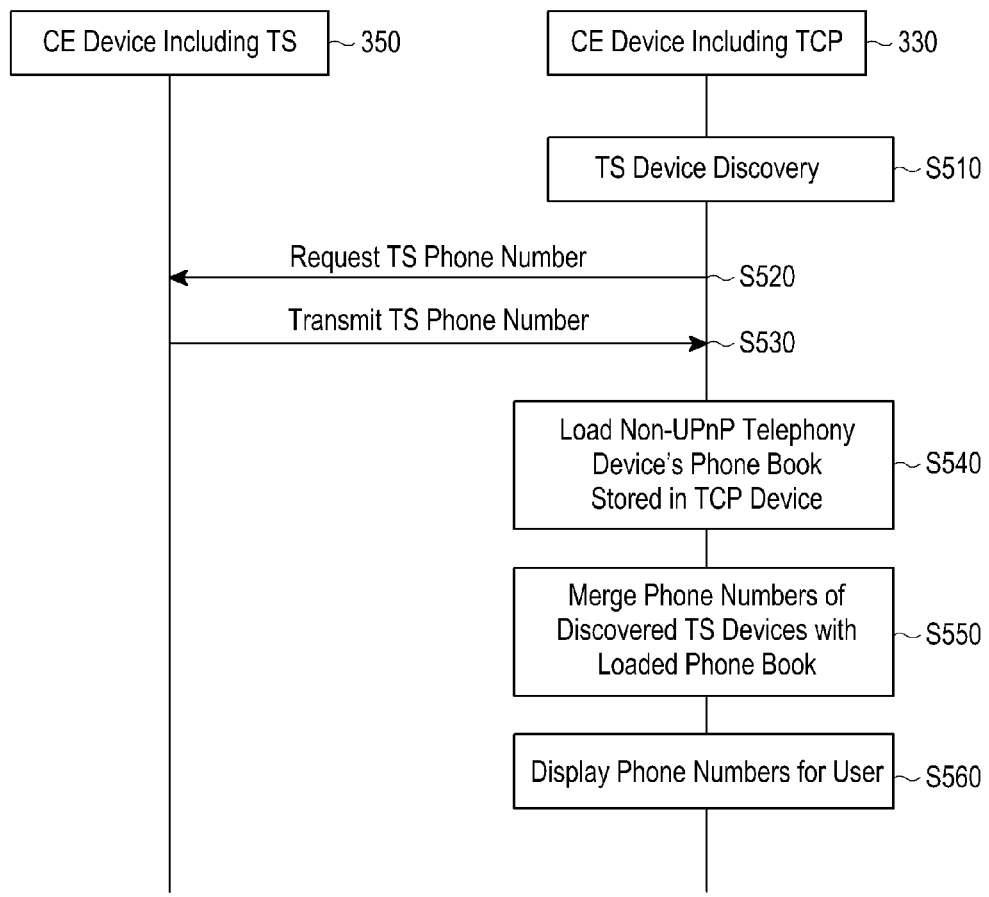
FIG. 15 is a diagram illustrating a mutual operation between a TS device and a TCP device when a Non-UPnP telephony device's phone book is present in the TCP device according to an embodiment of the present invention.

FIG. 15 illustrates a mutual operation between the TS device 350 and the TCP device 330 when a non-UPnP telephony device's phone book is present in the TCP device 330. Referring to FIG. 15, in step S510, the TCP device 330 discovers its neighboring TS devices through the common advertisement process, discovery process, and description process. In step S520, the TCP device 330 automatically requests phone numbers corresponding to each respective discovered TS device 350 from the relevant TS device 350 using a UPnP action (e.g., GetTelephonyIdentity( )). In step S530, the TS device 350 transmits its own phone number to the TCP device 330 in response to the request. In step S540, the TCP device 330 loads the phone book stored in the non-UPnP telephony device's phone book storage 333. In step S550, the TCP device 330 generates a phone number list by merging the phone numbers received from the neighboring TS devices with the loaded phone book. In step S560, the TCP device 330 displays the generated phone number list for the user.

Figure 18:
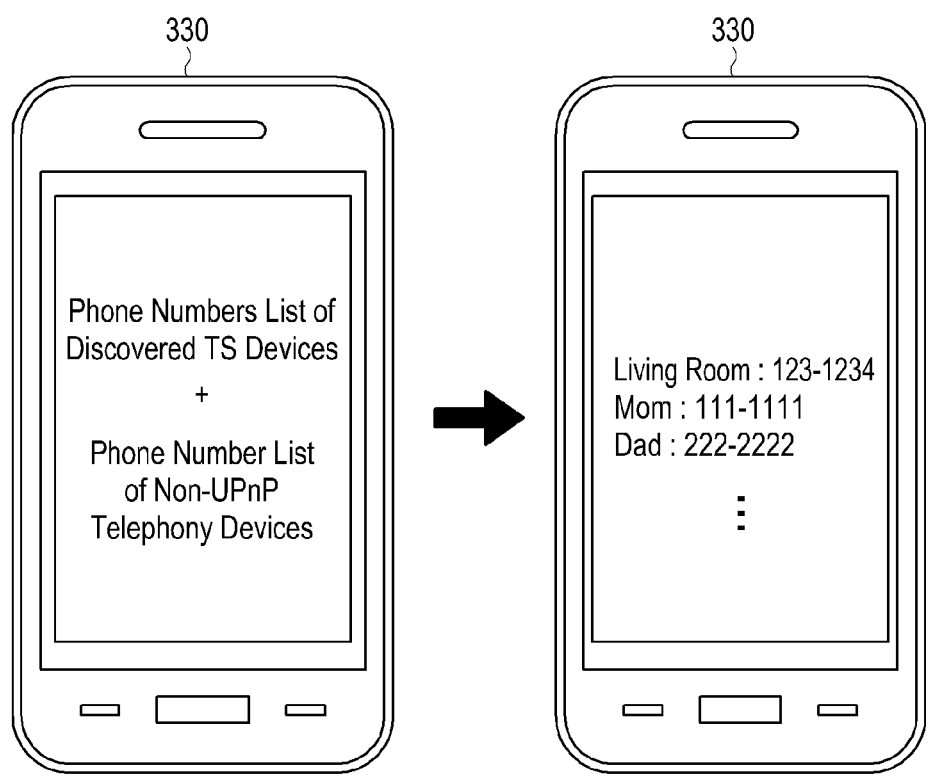
FIG. 18 is a diagram illustrating a sender's phone number list displayed on a display of a TCP device according to an embodiment of the present invention.

FIG. 18 illustrates a sender's phone number list displayed on a display of a TCP device according to an embodiment of the present invention. Although phone numbers of discovered TS devices and non-UPnP telephony devices are displayed in a mixed way in FIG. 18, the phone numbers of the discovered TS devices may be displayed in the top of the display and the phone numbers of the non-UPnP telephony devices may be displayed on the bottom of the display as shown in FIG. 14.

Figure 16:
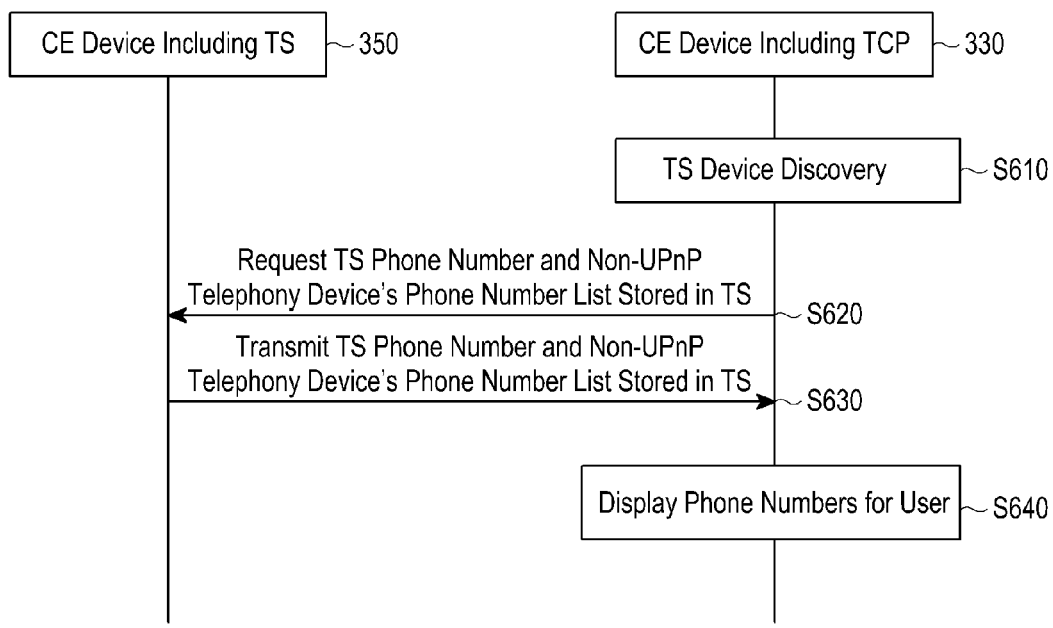
FIG. 16 is a diagram illustrating a mutual operation between a TS device and a TCP device when a Non-UPnP telephony device's phone book is not present in the TCP device according to an embodiment of the present invention.

FIG. 16 illustrates a mutual operation between the TS device 350 and a TCP device 330 when a non-UPnP telephony device's phone book is not present in the TCP device 330 according to an embodiment of the present invention.

Referring to FIG. 16, in step S610, the TCP device 330 discovers its neighboring TS devices through the common advertisement process, discovery process, and description process. In step S620, the TCP device 330 automatically requests a phone number of each discovered TS device 350 from the relevant TS device 350 using a UPnP action (e.g., GetTelephonyIdentity( ). The TCP device 330 may request a phone number list for non-UPnP telephony devices from the TS device 350. In step S630, the TS device 350 transmits its own phone number and a phone number list for non-UPnP telephony devices, to the TCP device 330. In step S640, the TCP device 330 receives the phone numbers received from the neighboring TS devices and the phone numbers of the non-UPnP telephony devices that are present in each TS device, and displays a merged phone number list thereof.

Figure 17:
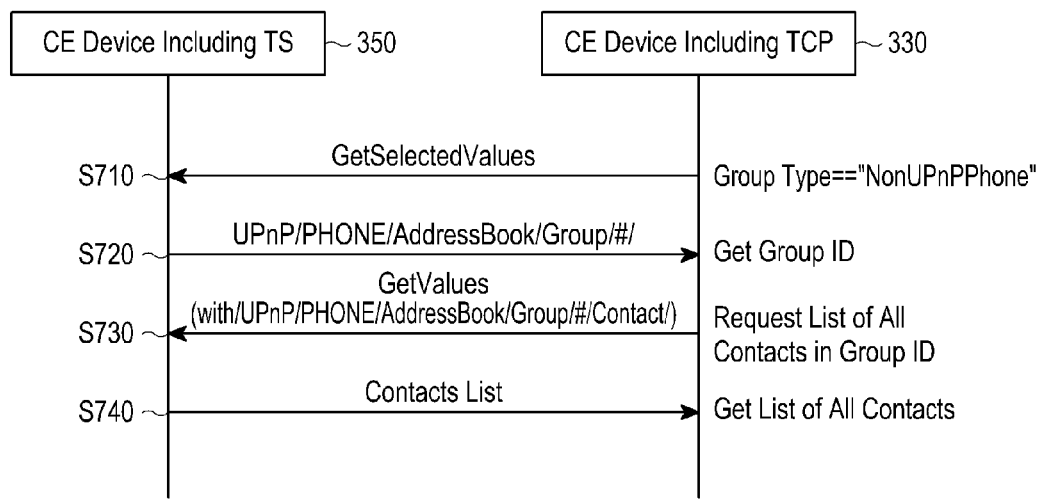
FIG. 17 is a flow diagram illustrating a detailed process of requesting a phone number list for non-UPnP telephony devices from each TS device by a TCP device according to an embodiment of the present invention.

FIG. 17 illustrates a detailed process of requesting a phone number list for non-UPnP telephony devices from each TS device 350 by the TCP device 330 according to an embodiment of the present invention.

Referring to FIG. 17, in step S710, the TCP device 330 requests a GetSelectedValues action from the TS device 350. In this request, a StartingNode input of the GetSelectedValues action is as follows:
 /UPnP/PHONE/AddressBook/Group/#/
Also, in this request, a filter input argument is as follows:
 /UPnP/PHONE/AddressBook/Group/#/
 Type="NonUPnPPhone"

In step S720, upon receiving the GetSelectedValues action along with these input arguments, the TS device 350 transmits values (Name, Address, Type, Note, and ContactNumberOfEntries) for the NonUPnPPhone group and a related group ID value ('#' part) to the TCP device 330 as a response message.

In step S730, the TCP device 330 requests the following group ID value from the TS device 350 along with a GetValues action:
 /UPnP/PHONE/AddressBook/Group/#/Contact/

In step S740, the TS device 350 transmits a list of all phone numbers belonging to the NonUPnPPhone group, to the TCP device 330.

The TCP device 330 may request the GetValues action instead of the GetSelectedValues action along with the following input argument, if it cannot use the GetSelectedValues action for the TS device 350:
 /UPnP/PHONE/AddressBook/Group/

The TCP device 330, which may receive information about all groups existing in the TS device 350 as a response message, may find an item with /UPnP/PHONE/AddressBook/Group/#/Type="NonUPnPPhone" and receive a group ID of the item, thereby continuously performing steps S730 and S740.

Figure 19:
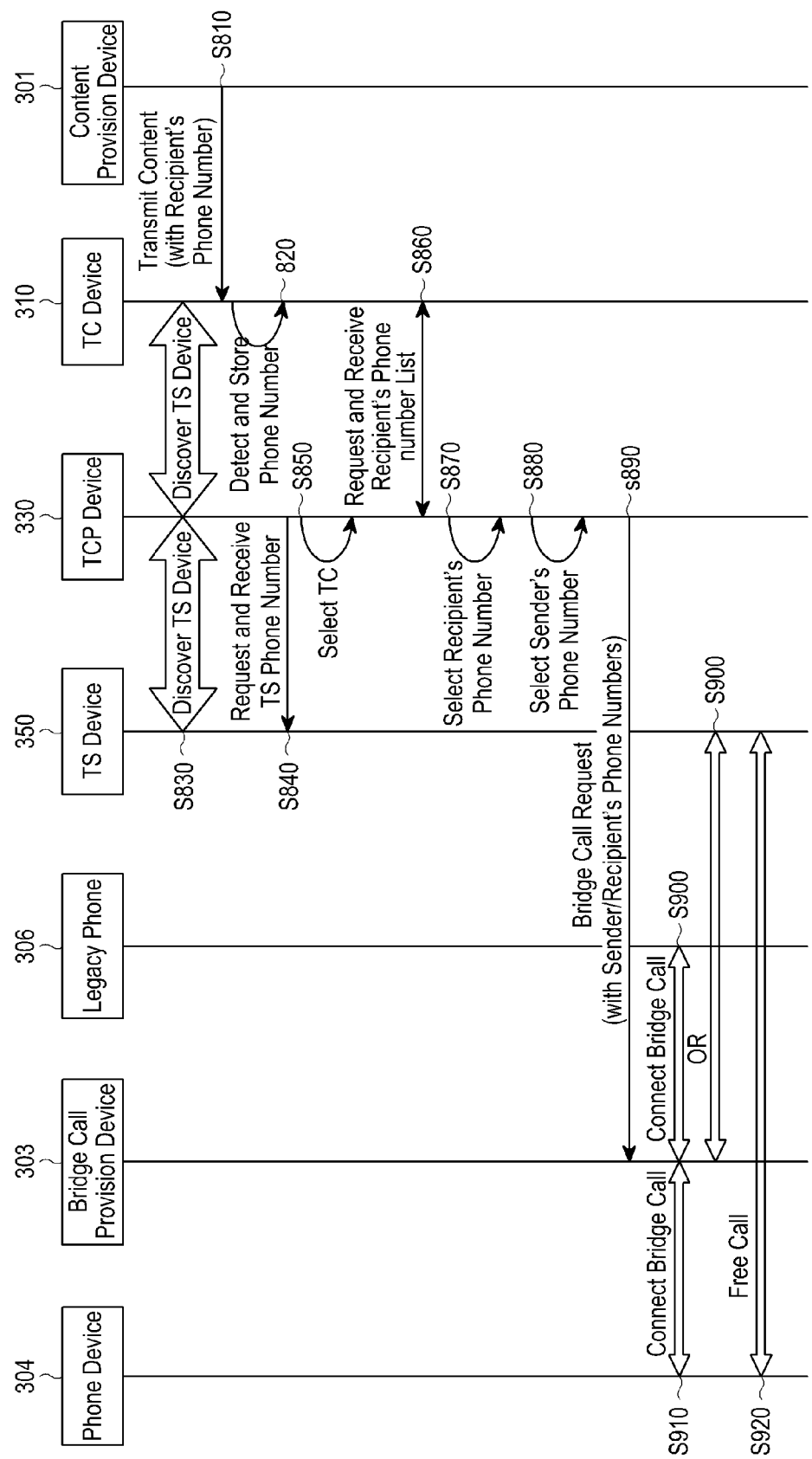
FIG. 19 is a flow diagram illustrating a method for providing an improved call bridge-based click-to-call service according to another embodiment of the present invention.

FIG. 19 illustrates a method for providing an improved call bridge-based click-to-call service according to another embodiment of the present invention.

Referring to FIG. 19, in step S810, the content provision device 301 transmits digital content including an advertisement by an advertiser, and a recipient's phone number of the phone device 304, to the TC device 310. In step S820, the TC device 310 detects the recipient's phone number from the received content, and stores the detected phone number. In step S830, the TCP device 330 discovers its neighboring TS device 350 and multiple UPnP telephony devices including the TC device 310, through the common advertisement process, discovery process, and description process. In step S840, the TCP device 330 automatically requests and receives a phone number of the TS device 350 and/or a phone number list for the non-UPnP telephony devices, from the discovered TS device 350. In step S850, the TCP device 330 displays a list of TC devices, for the user. The user selects one TC device 310 from the list of TC devices. In step S860, the TCP device 330 requests a list of recipient's phone numbers from the selected TC device 310.

In step S870, the TCP device 330 displays the recipient's phone number list for the user, and the user selects one recipient's phone number from the recipient's phone number list. In step S880, the TCP device 330 displays a sender's phone number list for the user, and the user selects one sender's phone number from the sender's phone number list.

In step S890, the TCP device 330 sends a bridge call request message including the selected recipient's phone number and sender's phone number, to the bridge call provision device 303. In steps S900 and S910, the bridge call provision device 303 attempts to connect a bridge call to the TS device 350 or a legacy phone 306, in step S900, and attempts to connect a bridge call to the phone device 304, in step S910, if the TS device 350 or the legacy phone 306 receives the call. In step S920, a call connection is achieved between the TS device 350 or the legacy phone 306 and the phone device 304, if the phone device 304 receives the call.

It will be understood that embodiments of the present invention may be implemented through hardware, software, or a combination thereof. Such software may be stored in volatile or non-volatile storage such as, for example, Read Only Memory (ROM) (including erasable and/or rewritable ROMs); memory such as, for example, Random Access Memory (RAM), memory chip/devices, or integrated circuits; or storage medium that is optically or magnetically writable and mechanically readable, such as, for example, Compact Discs (CD), Digital Versatile Discs (DVDs), magnetic discs, or magnetic tape. It can be appreciated that a memory, which may be mounted in a host device, is an example of a storage medium that is suitable to store a program or programs including elements of embodiments of the present invention, and is mechanically readable. Therefore, the present invention includes a program(s) including codes for realizing an apparatus and/or method defined in the appendix claims, and a storage medium capable of mechanically reading and writing the program. This program may be electronically transferred via an arbitrary medium such as a communication signal, which is delivered through wire/wireless connections, and the present invention properly covers equivalents thereof.

While the invention is shown and described herein with reference to certain embodiments thereof, it will be understood by those skilled in the art that various changes in form and details may be made therein without departing from the spirit and scope of the invention as defined by the appended claims and their equivalents.

What is claimed is:

1. A method for providing a click-to-call service, comprising:
 receiving, by a telephony control point device, multimedia content and acquiring a recipient's phone number from the multimedia content;
 generating, by the telephony control point device, a bridge call request message including the acquired recipient's phone number; and
 sending, by the telephony control point device, the bridge call request message to a telephony server device that forwards the bridge call request message to a bridge call provision device that provides a call connection, such that the call connection is performed between a recipient's phone device corresponding to the recipient's phone number and a sender's phone device,
 wherein the bridge call request message sent from the telephony control point device to the telephony server device does not include a sender's phone number.

2. The method of claim 1, wherein sending the bridge call request message includes:

sending the generated bridge call request message to the telephony server device;

modifying the bridge call request message by adding the sender's phone number therein; and sending the modified bridge call request message to the bridge call provision device.

3. The method of claim 1, wherein charges for the call connection are determined with respect to the bridge call provision device.

4. The method of claim 1, wherein sending the bridge call request message includes:

sending, by the telephony control point device, the generated bridge call request message to the telephony server device; and modifying, by the telephony server device, a format of the sent bridge call request message, and sending the format-modified bridge call request message to the bridge call provision device.

5. An apparatus for providing a click-to-call service, comprising:

a service receiver module for receiving multimedia content;

a phone number detection module for detecting a recipient's phone number from the multimedia content, and storing the detected recipient's phone number; and a telephony control point for generating a bridge call request message including the recipient's phone number, and sending the bridge call request message to a telephony server device that forwards the bridge call request message to a bridge call provision device that provides a call connection, such that the call connection is performed between a recipient's phone device corresponding to the recipient's phone number and a sender's phone device, wherein the bridge call request message sent from the telephony control point to the telephony server device does not include a sender's phone number.

6. The apparatus of claim 5, wherein charges for the call connection are determined with respect to the bridge call provision device.

7. A method for providing a click-to-call service, comprising:

receiving, by a telephony control point device, a recipient's phone number from a telephony client device that has acquired the recipient's phone number from multimedia content;

receiving, by the telephony control point device, senders' phone numbers from at least two telephony server devices;

generating, by the telephony control point device, a bridge call request message including the recipient's phone number and one of the senders' phone numbers; and sending, by the telephony control point device, the bridge call request message to a bridge call provision device that provides a call connection, such that the call connection is performed between a recipient's phone device having the recipient's phone number and a sender's phone device having the one of the senders' phone numbers.

8. The method of claim 7, wherein charges for the call connection are determined with respect to the bridge call provision device.

9. The method of claim 7, wherein generating the bridge call request message includes:

displaying, a list that includes at least two phone numbers corresponding to the senders, including the senders' phone numbers received from the telephony server devices; and generating a bridge call request message including the one of the senders' phone numbers, which is selected from the displayed list, and the recipient's phone number.

10. The method of claim 7, wherein receiving the sender's phone number includes:

requesting a phone number of the telephony server device and at least one phone number corresponding to at least one other phone device, which are stored in the telephony server device; and receiving the phone number of the telephony server device and the at least one phone number of the at least one other phone device from the telephony server device.

11. The method of claim 7, wherein receiving the recipient's phone number includes:

displaying a list corresponding to at least one telephony client device;

requesting a recipient's phone number from a telephony client device selected from the displayed list; and receiving the recipient's phone number from the selected telephony client device.

12. An apparatus for providing a click-to-call service, comprising:

a telephony control point for receiving a recipient's phone number from a telephony client device that has acquired the recipient's phone number from multimedia content, and receiving senders' phone numbers from at least two telephony server devices; and a bridge call request module for generating a bridge call request message including the recipient's phone number and one of the senders' phone numbers and sending the bridge call request message to a bridge call provision device that provides a call connection, such that the call connection is performed between a recipient's phone device corresponding to the recipient's phone number and a sender's phone device corresponding to one of the senders' phone numbers, wherein the telephony control point and the bridge call request module are included in a telephony control point device.

13. The apparatus of claim 12, wherein charges for the call connection are determined with respect to the bridge call provision device.

14. The apparatus of claim 12, further comprising a storage for storing phone numbers of phone devices.

* * * * *